United States Patent [19]

Baker

[11] 4,116,363
[45] Sep. 26, 1978

[54] SECURING MEANS FOR COOKING VESSELS

[75] Inventor: Fred E. Baker, Asheboro, N.C.

[73] Assignee: General Electric Company, Bridgeport, Conn.

[21] Appl. No.: 845,430

[22] Filed: Oct. 25, 1977

[51] Int. Cl.² .............................................. B65D 25/10
[52] U.S. Cl. .................................. 220/448; 220/246; 220/315; 219/432
[58] Field of Search ................. 220/17, 246, 248, 315, 220/448; 219/432; 99/646 C

[56] References Cited

U.S. PATENT DOCUMENTS

| | | | |
|---|---|---|---|
| 1,385,304 | 7/1921 | Bussler | 220/315 |
| 1,895,212 | 1/1933 | Smith | 220/17 |
| 2,430,542 | 11/1947 | Thompson | 220/248 |
| 3,113,761 | 12/1963 | Plateman | 220/17 |
| 3,428,737 | 2/1969 | Pou | 220/315 |
| 3,725,641 | 4/1973 | Tilp | 220/17 |
| 3,971,360 | 7/1976 | Spoeth | 220/17 |

Primary Examiner—William Price
Assistant Examiner—Joseph M. Moy
Attorney, Agent, or Firm—John F. Cullen; George R. Powers; Leonard J. Platt

[57] ABSTRACT

A cooking vessel of the type having an inner receptacle coaxially nested within a tubular housing is provided with structure for securing the inner receptacle within the tubular housing in a tamper-resistant manner and, when the inner receptacle and the housing are generally cylindrical, for preventing relative rotation therebetween. A first resiliently deformable locking member secured to the inner receptacle is deformed through an opening in a bottom wall which has a recess for receiving a second locking member. The second locking member engages the first locking member to hold the inner receptacle in its nested position within the housing, and the first locking member resiliently biases the second locking member into the recess to make removal of the second locking member relatively difficult.

7 Claims, 4 Drawing Figures

U.S. Patent    Sept. 26, 1978    4,116,363
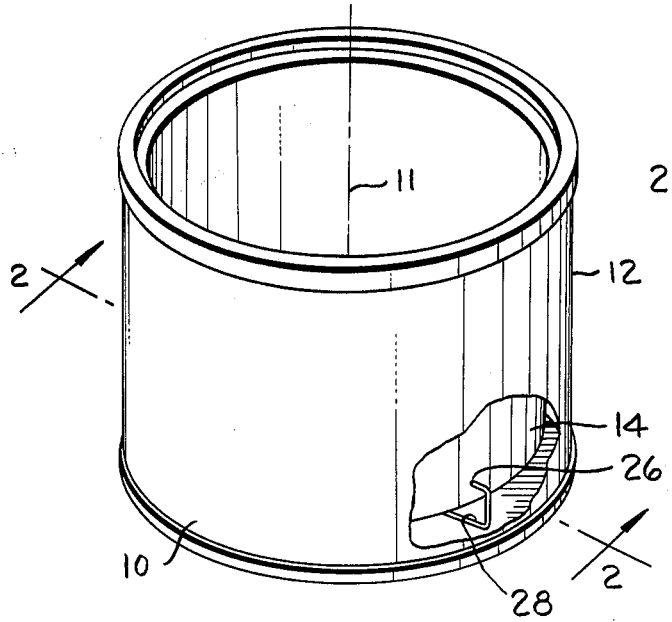
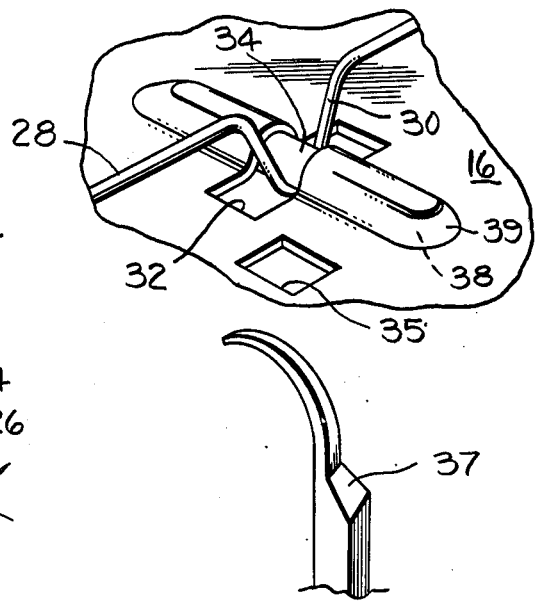
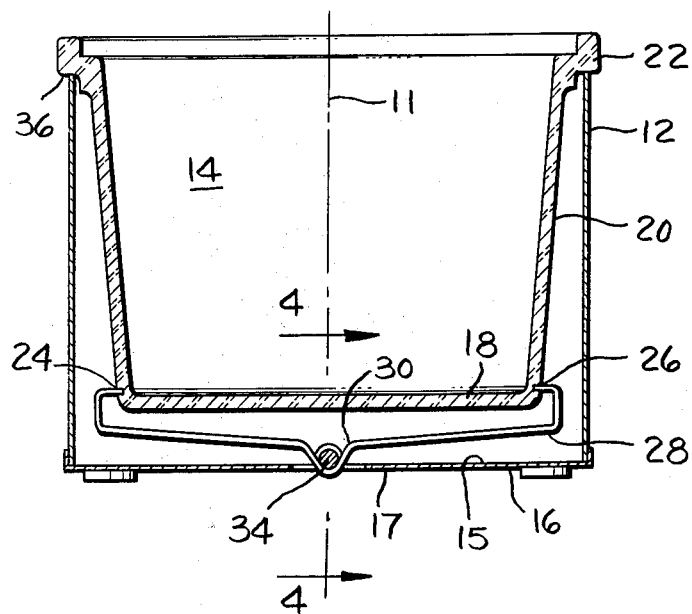
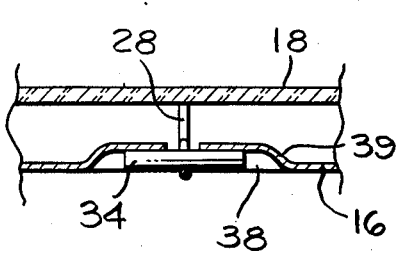

SECURING MEANS FOR COOKING VESSELS

BACKGROUND OF THE INVENTION

1. Field of the Invention

The invention relates to securing means for cooking vessels of type known as slow cookers in which an inner receptacle is coaxially nested within a tubular housing and, more particularly, to securing apparatus for providing a tamper-resistant assembly.

2. Description of the Prior Art

An electric cooking utensil known as a slow cooker typically includes an inner receptacle of glass or ceramic that acts as a cooking vessel mounted within a tubular shaped outer housing with an attached heating means between the two which is operated at a relatively low wattage over a long period of time. The inner ceramic vessel is provided with an annular lip on its upper portion to abut one end of the outer tubular housing. Closure of the assembly is provided by a base portion or bottom wall that is held at the opposite end of the tubular housing. Typically, the inner receptacle and lower base portion of the outer housing are pulled together by the spring force afforded by a resilient bail attached to the lower portion of the ceramic inner receptacle. A common scheme of attaching the two together uses an externally threaded member in the form of an eye bolt attached to the bail and the free end protrudes through an opening in the base of housing to receive an internally threaded nut. Tightening the nut produces axial displacement of the bail to produce a force to hold the inner receptacle and base portion together and apply axial force on the annular lip to provide a seal. Another form of securement uses a bolt depending from the bottom of the inner receptacle through the base portion of the outer tubular housing and tightening the bolt pulls the parts together. Such an arrangement is shown in U.S. Pat. No. 3,881,090. Both arrangements may be easly disassembled by the user with simple tools.

A tamper-resistant assembly for slow cookers would be advantageous since the practices referred to of completing the assembly with a standard nut provides for ready disassembly by anyone possessing simple hand tools. The tamper-resistant closure would limit access to authorized personnel with access to special equipment required for disassembly and repair.

SUMMARY OF THE INVENTION

It is a primary object of this invention to provide improved means for securing the glass or ceramic cooking inner receptacle within a slow cooker assembly.

A further object is to provide improved means for securing the inner ceramic receptacle in such a manner that special equipment is required to disassemble the device for repair.

Briefly stated, in the preferred form of the invention, an electric cooking utensil including an inner receptacle in the form of a vessel of glass or ceramic material has locking means providing a tamper-resistant assembly. The locking means permits locking an outer tubular housing having a lower end wall and a coaxially nested inner receptacle having an abutment means acting against the tubular housing to prevent relative downward axial movement. The locking means comprises a first resilient locking member secured to the inner receptacle and having a portion projecting through a non-circular opening in said end wall only with the application of an axial external force to the resilient locking member. A second locking member coacts with the end wall to maintain the axial displacement of the first resilient locking member and thus bias the abutment means of the tubular housing and the coaxially nested receptacle together.

BRIEF DESCRIPTION OF THE DRAWING

FIG. 1 is a partially cut-away view in perspective showing the nesting tubular members;

FIG. 2 is a cross-sectional elevation on line 2—2 of FIG. 1;

FIG. 3 is a partial perspective of the locking means for securing the members together and showing the special tool required for assembly and disassembly and, FIG. 4 is a partial section on line of 4—4 of FIG. 2.

DESCRIPTION OF THE PREFERRED EMBODIMENT

Referring first to FIG. 1, there is shown an electric cooking vessel or utensil 10 commonly known as a slow cooker and the typical slow cooker is formed around a vertical axis 11 by having a preferably cylindrical tubular metal outer housing 12, a coaxially nested inner receptacle in the form of a glass or ceramic vessel 14 and a metal base or bottom wall 16 with an upper surface 15 and a lower surface 17 remote from the inner receptacle as better seen in FIG. 2. The receptacle 14 includes a bottom wall 18 axially spaced from wall 16, and a generally cylindrical side wall 20 merging into bottom wall 18 such that foodstuffs may be received therein for cooking. To stop downward axial movement of inner vessel or receptacle 14, there is provided an annular lip 22 preferably formed integrally with the upper periphery of side wall 20 with the lip 22 extending radially outward of side wall 20 and tubular outer housing 12. For applying force to the inner receptacle, a pair of diametrically opposed holes 24 and 26 extend into the side wall 20 from its generally cylindrical side wall surface in a lower portion near the bottom of receptacle 14 and a resilient wire bail 28 extends under bottom wall 18 and is received in the holes 24 and 26 connecting the bail to the inner receptacle. In order to prevent upward axial and turning movement of receptacle 14, the bail acts as a first locking member which has a depending section 30 in the middle section or portion thereof which can be resiliently deformed to be pushed by an external force through an elongated and non-circular conforming opening 32 which has a predetermined cross-section and which is located in the base 16 as seen in FIG. 3. For securing the bail in place, there is provided a second complementary locking means including fastening member 34 which is preferably a circular pin of a predetermined length that is substantially larger than the cross-section predetermined dimension of opening 32.

The locking bail 28 has its central portion extending diametrically across the bottom of receptacle 14 between it and bottom wall means 16 and; being made of spring steel or other resilient material, it is resilient to permit the depending section 30 to be deformed and pulled as a loop below the bottom wall 16 through opening 32 and bias the lower annular surface 36 of lip 22 on the inner receptacle downwardly into sealing contact with the upper edge of tubular housing 12 and hold the pin 34 in position. As seen in FIG. 3, the bail may be conveniently pulled through the opening by a suitable tool 37 extending through additional opening 35 if necessary and which tool would be possessed only by the servicenter to make it at least difficult for the user to disassemble the device. For holding the bail in its downward resilient stressed position, recess area 38 having end surfaces 39 is provided in the lower surface 17 of bottom wall 16 and is disposed across at an angle to and oriented to intersect the respective dimension of opening 32 for bail portion 30 and so shaped that it mates with the locking pin 34. Thus, to lock the lower end of the inner receptacle, the fastening pin member 34 is disposed in the recess 38 and positioned such that member 34 is biased upwardly between bail portion 30 and the exterior surface 17 of bottom wall 16 while holding lip 22 against housing 12 by maintaining tension on resilient bail 28 and preventing rotation or upward movement of inner receptacle 14. The shape of the recessed area 38 substantially conforms to or mates with locking pin 34 such that, when nested, access to and removal by pushing or pulling of pin 34 is extremely difficult without the aid of special tool 37.

In operation, the bail is able to be pulled through the opening 32 only when it is deformed downward by tool 37, locking pin 34 dropped in position, the biasing force pulling the bail back up into locked position as shown in FIG. 3 and also sealing lip 22 to housing 12 to provide an easy assembly during manufacture while providing for a substantially tamper-resistant assembly by the user.

While there has been described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

What I claim as new and desire to secure by Letters Patent of the United States is:

1. In a cooking vessel including a tubular housing having a normally vertical axis, an inner receptacle coaxially nested within the tubular housing from the top thereof, and means preventing relative downward axial movement of the inner receptacle toward the bottom of the tubular housing beyond the nested position thereof, improved locking means for preventing relative upward axial movement of the inner receptacle away from the bottom of the tubular housing, said locking means comprising:

bottom wall means extending across the bottom of the tubular housing, said bottom wall means having an upper surface axially spaced from the bottom of the inner receptacle when the inner receptacle is in the nested position and a lower surface remote from the inner receptacle, said bottom wall means having an opening extending therethrough between said upper and lower surfaces thereof, a first resilient locking member secured to a lower portion of inner receptacle, said first locking member having a portion thereof and projecting downwardly through the opening in said bottom wall means only when said first locking member is substantially resiliently deformed axially downwardly from the inner receptacle, and a second locking member having a predetermined dimension substantially greater than a respective predetermined dimension of the opening in said bottom wall means, said bottom wall means having a recess in the lower surface thereof crossing said opening, the configuration of said recess mating with that of said second locking member such that said locking member being received in said recess, and said recess being oriented such that the predetermined dimension of said second locking member intersects the respective dimension of said opening when said second locking member is received in said recess, the portion of said first locking member projecting downwardly through the opening when first locking member is substantially resiliently deformed downwardly to receive said second locking member, whereby the locking means being assembled during the application of downwardly directed external axial force to said first locking member sufficient to substantially resiliently deform said first locking member, and whereby upon the release of such external axial force said first locking member will bias said second locking member into said recess and will thereafter resiliently prevent relative upward axial movement of the inner receptacle away from the bottom of the tubular housing.

2. Locking means as defined in claim 1 in which said second locking means comprises an elongated pin having its length as the predetermined dimension thereof, and in which said recess in said bottom wall means has end surfaces for preventing said elongated pin from being pushed or pulled out of said first locking member when said elongated pin is seated in said recess.

3. Locking means as defined by claim 1 in which the inner receptacle and the tubular housing are of generally cylindrical configuration and in which the opening in said bottom wall means has a non-circular cross-section, and in which the portion of said first locking means projecting downwardly through the opening has a configuration complementary with the non-circular opening to substantially prevent rotation of the inner receptacle relative to the tubular housing about the normally vertical axis thereof.

4. Locking means as defined by claim 1 in which said first locking member is a wire bail having ends secured to the inner receptacle and a central portion intermediate the ends extending generally diametrically across the bottom of the inner receptacle between the inner receptacle and said bottom wall means, said central portion of said bail formed such that a depending section thereof provides a loop extending below said bottom wall means for receiving said second locking member and for resiliently biasing said second locking member into said recess.

5. Locking means as defined by claim 4 in which said second locking member comprises an elongated pin having its length as the predetermined dimension thereof, and in which said recess in said bottom wall means has end surfaces for preventing said elongated pin from being pushed or pulled out of said first locking member when said elongated pin is seated in said recess.

6. Locking means as defined by claim 5 in which the inner receptacle and the tubular housing are of generally cylindrical configuration and in which the opening in said bottom wall means has a non-circular cross-section conforming to the loop portion of said bail so as to substantially prevent rotation of the inner receptacle relative to the tubular housing about the normally vertical axis thereof.

7. A cooking vessel comprising:
   a tubular housing having a normally vertical axis, an inner receptacle coaxially nested within said tubular housing, said inner receptacle including an annular upper lip for coaxially abutting the upper end of said tubular housing when said inner receptacle is nested therein preventing relative downward axial movement of said inner receptacle toward the bottom of said tubular housing beyond the nested position thereof, said tubular housing and said inner receptacle including complementary locking means for substantially preventing rotation of said inner receptacle relative to said tubular housing about the vertical axis thereof, bottom wall means extending across the bottom of the tubular housing, said bottom wall means having an upper surface axially spaced from the bottom of said inner receptacle when said inner receptacle is in its nested position and a lower surface remote from the inner receptacle, said bottom wall means having an opening extending therethrough between said upper and lower surfaces thereof, a first resilient locking member secured to a lower portion of the inner receptacle, said first locking member having a portion thereof and projecting downwardly through the opening in said bottom wall means only when said first locking member is substantially deformed axially downwardly from the inner receptacle, and a second locking member having a predetermined dimension substantially greater than a respective predetermined dimension of the opening in said bottom wall means, said bottom wall means having a recess in the lower surface thereof crossing said opening, the configuration of said recess mating with that of said second locking member such that said second locking member being received in said recess, and said recess being oriented such that the predetermined dimension of said second locking member is oriented with the respective dimension of said opening when said second locking member is receiving in said recess, the portion of said first locking member projecting downwardly through the opening when first locking member is substantially resiliently deformed downwardly to receive said second locking member, whereby the locking means being assembled during the application of downwardly directed external axial force to said first locking member sufficient to substantially resiliently deform said first locking member, and whereby upon the release of such external axial force said first locking member will bias said second locking member into said recess and prevent relative upward axial movement of the inner receptacle away from the bottom of the tubular housing.

* * * * *